United States Patent [19]

Sealock, Jr. et al.

[11] Patent Number: 5,630,854
[45] Date of Patent: *May 20, 1997

[54] METHOD FOR CATALYTIC DESTRUCTION OF ORGANIC MATERIALS

[75] Inventors: L. John Sealock, Jr.; Eddie G. Baker; Douglas C. Elliott, all of Richland, Wash.

[73] Assignee: Battelle Memorial Institute, Richland, Wash.

[*] Notice: The term of this patent shall not extend beyond the expiration date of Pat. No. 5,019,135.

[21] Appl. No.: 307,552

[22] Filed: Sep. 16, 1994

Related U.S. Application Data

[63] Continuation of Ser. No. 912,002, Jul. 10, 1992, abandoned, which is a continuation of Ser. No. 168,470, Mar. 15, 1988, abandoned, which is a continuation-in-part of Ser. No. 107,175, Oct. 13, 1987, abandoned, which is a continuation of Ser. No. 773,338, Sep. 6, 1985, abandoned, which is a continuation of Ser. No. 380,027, May 20, 1982, abandoned.

[51] Int. Cl.$^6$ .................... C01B 3/00; C10D 1/28
[52] U.S. Cl. .................... 48/127.7; 48/197 R; 48/202; 48/214; 585/233; 588/208; 588/218
[58] Field of Search .................... 48/202, 197 R, 48/197 A, 209, 214 A, 127.7; 585/733; 210/757, 758, 762, 763; 588/205–209, 213, 218

[56] References Cited

U.S. PATENT DOCUMENTS

| | | |
|---|---|---|
| 1,608,075 | 11/1926 | Wallin . |
| 3,148,227 | 9/1964 | Hearon et al. . |
| 3,410,661 | 11/1968 | Taylor .................... 48/214 A |
| 3,433,610 | 3/1969 | Feldkirchner et al. .................... 48/214 A |
| 3,505,204 | 4/1970 | Hoffman . |
| 3,715,195 | 2/1973 | Tassoney et al. . |
| 3,890,113 | 6/1975 | Child et al. . |
| 3,915,670 | 10/1975 | Lacey et al. .................... 48/197 R |
| 3,919,114 | 11/1975 | Reynolds . |
| 3,926,583 | 12/1975 | Restrup-Nielsen . |

(List continued on next page.)

FOREIGN PATENT DOCUMENTS

| | | |
|---|---|---|
| 1074117 | 8/1980 | Canada . |
| 0157339 | 10/1985 | European Pat. Off. . |
| 2530600 | 1/1977 | Germany .................... 48/202 |
| 3133723 | 3/1983 | Germany . |

OTHER PUBLICATIONS

Franck, "Equilibria in Aqueous Electrolyte Systems at High Temperatures and Pressures," *Phase Equilibria and Fluid Properties in the Chemical Industry*, Storvick and Sandler, eds., ACS Symposium Series #60 (1977), 4 pp.

Gallagher, Jr., et al., "Catalytic Coal Gasification for SNG Manufacture," *Energy Research*, 4:137–147 (1980).

Lemieux, et al., "Preliminary Engineering Data for Scale Up of a Biomass Vacuum Pyrolysis Reactor," *Am. Chem. Soc.*, (1987) 6 pp.

Modell, "Reforming of Glucose and Wood at the Critical Conditions of Water," *Am. Soc. of Mech. Eng.* (Apr. 1977) 8 pp.

Shafizadeh, "Introduction to Pyrolysis of Biomass," *J. Anal. Appl. Pyrol.*, vol. 3 (1982), 25 pp.

(List continued on next page.)

*Primary Examiner*—Nina Bhat
*Attorney, Agent, or Firm*—Wells, St. John, Roberts, Gregory & Matkin, P.S.

[57] ABSTRACT

A method is disclosed for converting waste organic materials into an innocuous product gas. The method comprises maintaining, in a pressure vessel, in the absence of oxygen, at a temperature of 250° C. to 500° C. and a pressure of at least 50 atmospheres, a fluid organic waste material, water, and a catalyst consisting essentially of reduced nickel in an amount sufficient to catalyze a reaction of the organic waste material to produce an innocuous product gas composed primarily of methane and carbon dioxide. The methane in the product gas may be burned to preheat the organic materials.

1 Claim, 7 Drawing Sheets

U.S. PATENT DOCUMENTS

| | | |
|---|---|---|
| 3,929,431 | 12/1975 | Koh et al. . |
| 4,082,520 | 4/1978 | Baron et al. . |
| 4,113,446 | 9/1978 | Modell et al. ............................ 48/209 |
| 4,188,193 | 2/1980 | Felbeck, Jr. . |
| 4,239,499 | 12/1980 | Pfefferle ................................ 48/214 A |
| 4,318,712 | 3/1982 | Lang et al. . |
| 4,336,034 | 6/1982 | Lang et al. . |
| 4,338,199 | 7/1982 | Modell . |
| 4,500,323 | 2/1985 | Siegfried ................................. 48/202 |
| 4,543,190 | 9/1985 | Modell . |
| 4,652,686 | 3/1987 | Colmen et al. ......................... 585/240 |
| 4,657,681 | 4/1987 | Hughes et al. . |
| 4,699,632 | 10/1987 | Babu et al. . |
| 5,019,135 | 5/1991 | Sealock, Jr. et al. ................. 48/197 R |
| 5,114,541 | 5/1992 | Bayer ....................................... 44/605 |
| 5,280,701 | 1/1994 | Radon Tolman . |

OTHER PUBLICATIONS

Baker & Sealock, "Catalytic Destruction of Hazardous Organics in Aqueous Solutions," *Prepared for U.S. Dept. of Energy, PNL–6491–2*, (Apr. 1988) (odd page numbers only).

Baker & Sealock, "Catalytic Destruction of Hazardous Organics in Aqueous Solutions," *5th Natl. Conf. on Hazardous Wastes and Hazardous Materials*, (Apr. 1988).

Chemical Abstracts, vol. 43, Cols. 1944 and 1945 (no date).

Modell, "Gasification and Liquefaction of Forest Products in Supercritical Water," paper presented at the 89th National Meeting of the American Institute of Chemical Engineers, Aug. 20, 1980.

Mudge et al., "Catalyzed Steam Gasification of Biomass," *J. Analy. & Appl. Pyrol.* 1:165–175 (1979).

Ross et al., "The Conversion of Cellulose to Fuel Gases Promoted by Selected Solid Additives," *Conservation & Recycling* 4:15–18 (1981).

Weber et al., "Gasification of Biomass in the Presence of Multiple Catalysts for the Direct Production of Specific Products," Paper presented at Energy from Biomass & Wastes IV of Institute of Gas Technology, Jan. 21–25, 1980.

Willson et al., "Alkali Carbonate and Nickel Catalyses of Coal Steam Gasification," *Coal Gasification*, ed. Massey, Advances in Chem. Series No. 131, ACS, 1974, pp. 203–211.

Yoneda et al., "Water Gas Conversion . . . Ferric. Ion Cat.," *J. Soc. Chem. Ind. Japan*, 44:385–387 (1941).

Yoneda et al., "Water Gas Conversion Under Elevated Pressure," *J. Soc. Chem. Ind. Japan*, 44:388 (1941).

Yoneda et al., "Water Gas Conversion . . . Under High Pressure," *J. Soc. Chem. Ind. Japan*, 44:667–669 (1942).

Yoneda et al., "Water–Gas Conversion Under Elevated Pressure III, The Behavior of Water–Gas in Aqueous Potassium Carbonate Solution Under Elevated Temperature and Pressure," *J. Soc. Chem. Ind. Japan*, 46:554–556 (1943).

Yoneda et al., "Water Gas Conversion . . . Potassium Formate," *J. Soc. Chem. Ind. Japan*, 47:5–7 (1944).

Yoneda et al., "Water Gas Conversion . . . Decomposition Temperature," *J. Soc. Chem. Ind. Japan*, 47:7–8 (1944).

Yoneda et al., "Water–Gas Conversion Under Elevated Pressure III, The Behavior of Water–Gas in Aqueous Potassium Carbonate Solution Under Elevated Temperature and Pressure," (abstract), *Chem. Abs.*, 43:1944i (1949).

Garg et al., "The Hydrogasification of Wood," *Industrial & Engineering Chemistry Research*, 27:256–264 (Feb. 1988).

Amin, et al., "Reforming and Decomposition of Glucose in an Aqueous Phase," *Am. Soc. of Mech. Eng.*, (Apr. '75), 9 pp.

Cox, et al., "Conversion of Organic Waste to Fuel Gas," *J. Envtl. Eng. Div.*, (Jun. '74), 17 pp.

Baker, "Catalytic Destruction of Hazardous Organics in Aqueous Wastes," *Preposal to U.S. EPA*, (Dec. '87), 10 pp.

Butner, et al., "Low–Temperature Thermochemical Conversion of High–Moisture Biomass Feedstocks," *17th Biomass Thermochemical Conversion Program Contractor's Meeting*, (Oct. '85), 18 pp.

METHOD FOR CATALYTIC DESTRUCTION OF ORGANIC MATERIALS

This invention was made with government support under Contract No. DE-AC06-76RL0 1830 awarded by United States Department of Energy. The government has certain rights in this invention.

This is a continuation of application Ser. No. 07/912,002, filed Jul. 10, 1992 now abandoned which is a continuation of application Ser. No. 168,470, filed Mar. 15, 1988 now abandoned which is a continuation-in-part of application Ser. No. 107,175, filed Oct. 13, 1987 now abandoned, which is a continuation of application Ser. No. 773,338, filed Sep. 6, 1985, now abandoned, which is a continuation of application Ser. No. 380,027 filed May 20, 1982, now abandoned. Each of these listed applications is incorporated herein by reference.

FIELD OF THE INVENTION

The present invention relates to methods for the destruction of organic materials, and in particular, the conversion of waste organic materials into an innocuous product gas at a relatively low temperature.

BACKGROUND OF THE INVENTION

The quantities and types of organic wastes being generated has grown significantly over the past decade. Many of these organic wastes are hazardous in that they present significant environmental and health hazards. Hazardous wastes previously disposed of by unacceptable methods continue to be discovered in various wastes sites. Improved methods for treatment and disposal of these hazardous wastes are required to meet environmental standards and to treat these wastes in a cost-effective manner.

Recently, there have been increased research efforts aimed at improving the methods used to deactivate hazardous materials at problem waste sites. It is desirable to treat these wastes so that they can be reused, converted into a less hazardous material or be disposed of in a stabilized form to reduce environmental concerns. Technologies currently being developed and employed include wet air oxidation, ozonation, molten salt combustion, electrochemical oxidation, neutralization, catalytic hydrogenation and incineration. Continued development and improvement of cost effective environmentally acceptable treatment technologies for many hazardous wastes are still required.

Several commercial treatment technologies exist for treating low organic content water streams (<1000 ppm) by using conventional water purification methods and for treating high concentration streams (>10%) by various costly methods including solvent extraction and incineration. However, there exists the need to be able to treat concentration ranges not presently commercially treatable (1–5%), as well as other concentration ranges.

Conversion of some waste organic materials, such as contained in biomass materials, to low-BTU fuel gas, carbon monoxide and hydrogen by pyrolysis and substoiciometric burning is well known. Studies undertaken to optimize this process have demonstrated that high temperatures with or without catalysts are required to minimize tar and char formation in this reaction. Recent interest in organic conversion has been aimed at production of a medium-BTU gas through the use of a steam and/or oxygen gasification environment. These processes would produce a cleaner carbon monoxide/hydrogen gas mixture which would be used for synthesis of methane as well as other products.

SUMMARY OF THE INVENTION

A method has now been discovered to convert organic waste materials to an innocuous product gas containing primarily methane, carbon dioxide and hydrogen, at lower temperatures (250° C. to 500° C.) than conventional conversion processes. A pressure system is used to contain water, which is a reactant essential as a source of hydrogen. High pressure in the reactor system (above 50 atm) is generated both by the vapor pressure of the water and the gas product produced from the organic materials.

According to this disclosure, waste organic materials can be converted to a innocuous gas product rich in methane in the presence of water and a reduced nickel catalyst in a high-pressure reactor with pressure above 50 atm at a temperature of 250° C. to 500° C. at rates similar to those achieved in a nonpressurized reactor at temperatures that are 200° C. to 300° C. higher. Additionally, methane production is greatly increased due to the lower temperatures and higher pressures of the system.

Because they employ low temperatures, methods according to the invention are particularly well suited to be performed with transportable processing equipment. Such equipment can, for example, easily be transported from one waste disposal site to another, as needed.

DETAILED DESCRIPTION

In accordance with the present invention, a pressurized aqueous system is used for the conversion of waste organic materials into an innocuous gas product.

For the purpose of this disclosure, "organic waste materials" means any multi-carbon organic compound or mixture of such compounds that exists as or decomposes to a liquid or gas at a temperature of at least 250° C. and at a pressure of 50 atmospheres or more, and any aqueous solution, suspension, slurry or sludge containing such a compound or mixture. Such multi-carbon organic compounds include nitrogenated hydrocarbon compounds.

The present invention is a method for converting waste organic materials into an innocuous product gas. This is accomplished by feeding an organic waste material, in the form of an aqueous solution or slurry, into a pressure vessel. The process can treat aqueous wastes with a wide range of organic concentrations, but is best suited for streams containing 0.1–10.0% organics. For waste waters containing less than 0.1% organics, a preconcentration step may be appropriate. The amount of water present must be sufficient to provide hydrogen as needed to promote the formation of product gasses.

Inside the pressure vessel, the waste material is maintained in the absence of oxygen at a temperature of 250° C. to 500° C. and a pressure of at least 50 atmospheres, with additional water (if the organic waste material is highly concentrated) and an amount of reduced nickel sufficient to catalyze a reaction of the organic waste material to produce an innocuous product gas composed primarily of methane and carbon dioxide. The best results are achieved, with most feedstocks, at about 400° C.

The method can further include the steps of pretreating the waste organic materials to break down solids and preheating the organic materials before delivery to the pressure reactor. In particular, when present in sufficient quantity, a portion of the methane in the product gas is recovered by conventional gas recovery techniques and burned to preheat the waste organic material before delivery to the pressure reactor. The present process can be used as a waste water treatment technology, a method for cleanup of organic contaminated waters or as a method for energy production from waste organic materials.

In order to study the kinetics of the waste organic conversion process of the present invention, an experimental reactor system was developed. In the experimental system, aqueous waste has been converted at low temperatures (300° C. to 460° C.) and pressures up to 340 atm to innocuous gases consisting primarily of methane, carbon dioxide and hydrogen. The experimental system is equipped with a sampling system which allows several samples to be taken throughout the course of the experiment while the reactor is maintained at reaction temperature and pressure.

Figure 1:
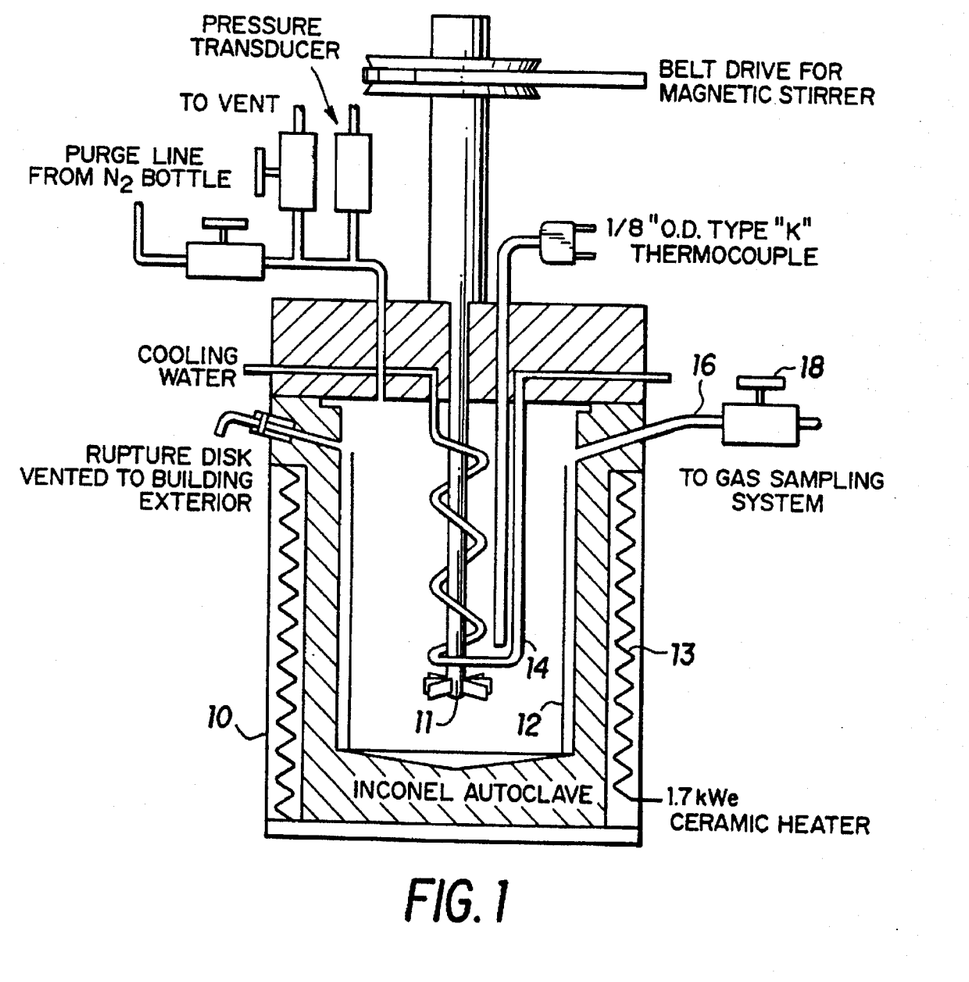
FIG. 1 is a schematic cross-sectional view of an autoclave apparatus for testing the method of the present invention.

The experimental reaction system is shown in FIG. 1. The pressure vessel is a one liter autoclave 10 equipped with a magnetic stirrer 11. The autoclave 10 is of conventional design and is operated with standard electrical heating, cooling and stirring equipment provided with the unit. A stainless steel liner 12 is fitted into the reactor to facilitate product recovery and reactor cleanup.

The autoclave 10 is heated with an electric heater 13 with the capability to heat the reaction environment to approximately 500° C. Typical heat-up time required to heat 300 ml of aqueous waste and catalyst to 400° C. is about 90 minutes. The aqueous waste and catalyst are rapidly mixed inside the autoclave 10 by the magnetic stirrer 11. The system is provided with a cooling coil 14 that is used to cool down the reactor contents at the end of each experiment.

Gas samples are taken from the autoclave 10 through a body wall port 16 in the top of the reactor. The autoclave 10 and sample removal system are operated remotely after the reactor has been batch charged. The sampling system shown in FIG. 2 employs the combination of a manually operated sampling valve 18 and a pressure transducer 20 to collect carefully controlled sample volumes. Typically, the sample loop is filled to a pressure of 3 atm.

Figure 2:
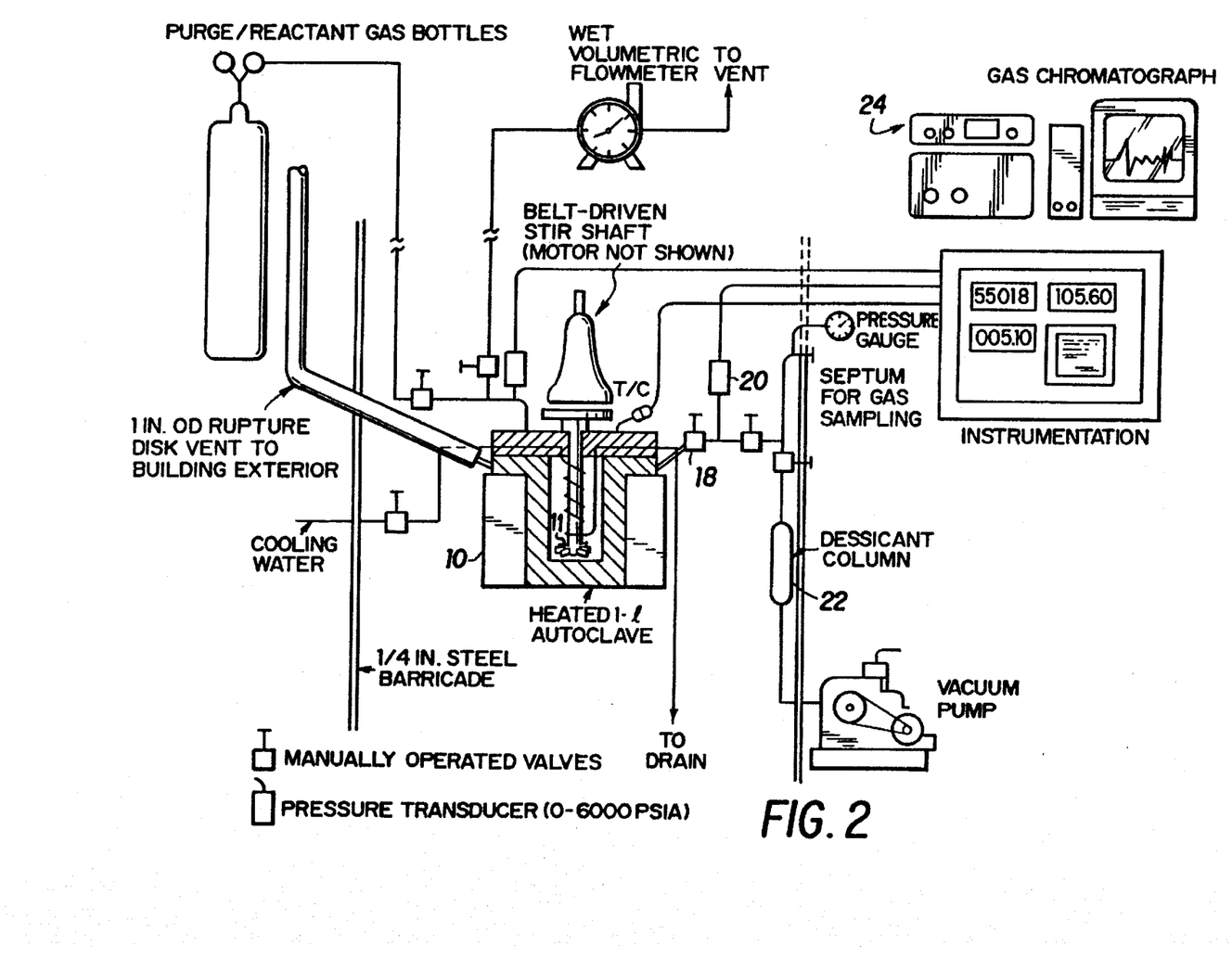
FIG. 2 is a schematic view of the experimental system used in connection with the present invention.

The volume of the sampling system is about 3.9 ml (2.6 ml sample holding loop plus 1.3 ml dead space prior to the sampling valve). The sampling system allows the entire sample loop to be evacuated prior to taking a sample, thus avoiding contamination from previous samples. The system is equipped with an adsorbent column 22 to collect any water or other liquids in the samples. This column 22 is weighed before and after experiments to permit quantitative determination of the mass of water collected. Tests performed to determine the effect of sample withdrawal from the system have indicated that variances due to the sample removal are indistinguishable from the variations due to experimental error.

In a typical catalytic experiment, the desired amount of organic waste, catalyst (ground to a powder) and any needed make-up water were weighed and charged to the stainless steel liner 12. The mixed waste/catalyst slurry in the liner 12 was placed in the autoclave 10 under ambient conditions. The autoclave 10 was sealed, purged with nitrogen, tested for leaks at 70 atm with nitrogen and vented until the pressure in the reactor was approximately 8 atm. The nitrogen that remained in the reactor was used as a reference to monitor the accumulation of gaseous products produced during the conversion of the organic. This was accomplished by measuring the dilution of the nitrogen in the gas samples taken at regular intervals once the reactor reached the desired reaction temperature. The reactor was then held at this temperature for approximately one hour. Pressures in the system ranged from about 135–375 atm depending on the reaction temperature selected and the amount of gas produced.

At the end of each experiment, cooling water was flushed through the internal cooling coil 14 of the reactor and the contents were brought to a temperature of 200° C. within about 5 minutes. After the autoclave 10 had cooled completely, the gas product was vented and analyzed by conventional methods using a gas chromatograph 24. The liquid contents of the reactor were removed, measured and saved for later analysis by conventional methods, including gas chromatography. Solids, which were primarily catalyst, were filtered from the liquids, dried, weighed and the carbon content thereof determined.

Waste conversion was determined by subtracting the weight of the original organic waste still present in the reactor liquid product from the weight of organic material charged to the reactor. Carbon conversions to gas were calculated and amounts of gas produced were calculated.

Tests were completed with a variety of organic compounds at several concentrations, and several different types and concentrations of catalysts. In general, the reaction temperature was varied between 300° C. and 460° C. and the reaction pressure varied between 135 atm and 375 atm.

CATALYST CHOICE

In order to determine the optimum catalyst composition, a number of tests were performed at 400° C. with 10% hexone in water using a variety of catalysts at a catalyst concentration of 1.2 g catalyst per g of hexone. The conversion of the hexone with the various catalysts are summarized in TABLE I.

TABLE I

Hexone Conversion With Different Catalysts (400° C., 10% Hexone in Water, 1.2 g Catalyst/g Hexone)

| Catalyst | Supplier | Catalyst Composition | Composition Active Metals | Form | Hexone Conversion wt % |
|---|---|---|---|---|---|
| Ni 1404 | Harshaw | Ni/Al$_2$O$_3$ | 64% Ni | Reduced & stabilized | 99.7 |
| Ni 3288 | Harshaw | Ni/Al$_2$O$_3$ | 60% Ni | Reduced & stabilized | 99.6 |
| G-65 RS | United Catalysts | Ni/refractory | 27% Ni | Reduced & | 99.4 |

TABLE I-continued

Hexone Conversion With Different Catalysts (400° C., 10% Hexone in Water, 1.2 g Catalyst/g Hexone)

| Catalyst | Supplier | Catalyst Composition | Composition Active Metals | Form | Hexone Conversion wt % |
|---|---|---|---|---|---|
| — | Engelhard | Pt/Al$_2$O$_3$ | 5% Pt | stabilized Reduced | 49.4* |
| KAT 479 | Katalco | CoMo/Al$_2$O$_3$ | 19% MoO$_3$ 4% CoO | Un-reduced | 23.1 |
| G-62 RS | United Catalysts | Co/refractory | 34.5% Co | Reduced | 14.9 |
| G-90C | United Catalysts | Ni/Al$_2$O$_3$ | 15% Ni | Un-reduced | 14.6 |
| LZY82 | Union Carbide | Y-Zeolite | — | — | 13.4 |
| G-65 | United Catalysts | Ni/refractory | 25% Ni | Un-reduced | 12.2 |
| Ni 3263 | Harshaw | Ni/Al$_2$O$_3$ | 64% Ni | Un-reduced | 10.0 |
| — | — | Na$_2$CO$_3$ | — | — | 7.9 |
| C-73 | United Catalysts | Fe$_2$O$_3$ | 95% Fe$_2$O$_3$ | Un-reduced | 6.9 |
| G-47 | United Catalysts | Fe$_2$O$_3$/Al$_2$O$_3$ | 3% Fe$_2$O$_3$ | Un-reduced | 6.4 |
| C-73 RS | United Catalysts | Fe$_2$O$_3$ | — | Reduced & Stabilized | 5.5 |
| None | — | — | — | — | 6.0 |

*Conversion was primarily to carbon (38%) with a lesser amount to gases and liquids (11%).

As can be clearly seen from TABLE I, the best conversions (>99.4%) were achieved using catalysts containing nickel in a reduced and stabilized form (Ni 1404, Ni 3288 and G-65 RS). These catalysts were stabilized by contact with carbon dioxide. To maintain the nickel catalyst in reduced form, a nonoxidizing atmosphere is maintained in the reactor.

Other catalysts, included nickel catalysts which were unreduced, produced impractically low conversions of the hexone. Hexone conversion using the three unreduced nickel catalysts (G-90C, G-65 and Ni 3263) was 10.0–14.6%. A platinum catalyst was useful to convert a moderate amount of hexone, but the resulting product was less than 11% gasses and liquids. The hexone conversion with no catalyst was 6.0%.

EFFECT OF CATALYST LOADING

Figure 3:
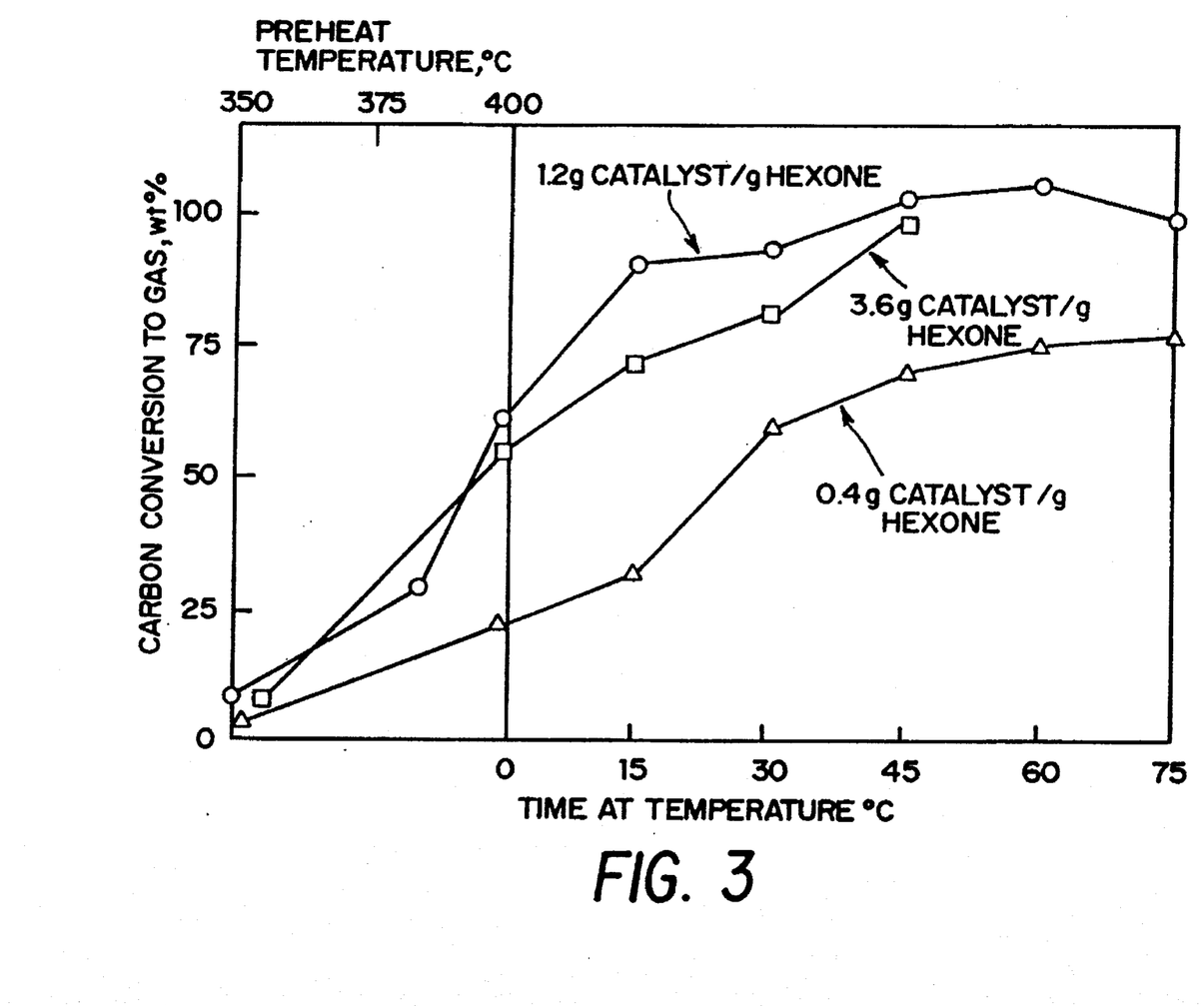
FIG. 3 is a graph showing the effect of catalyst loading on carbon conversion to gas in the present invention.

In order to determine the effect of catalyst loading, Ni 1404 in concentrations of 0.4, 1.2 and 3.6 g catalyst per g hexone was tested. FIG. 3 shows the carbon conversion to gas as a function of time at temperature for these three different catalyst loadings. There is little difference between 1.2 and 3.6 g catalyst/g hexone, but the rate of conversion is significantly slower with 0.4 g catalyst/g hexone.

For continuous operation, increasing the amount of catalyst will increase the throughput.

EFFECT OF TEMPERATURE

Figure 4:
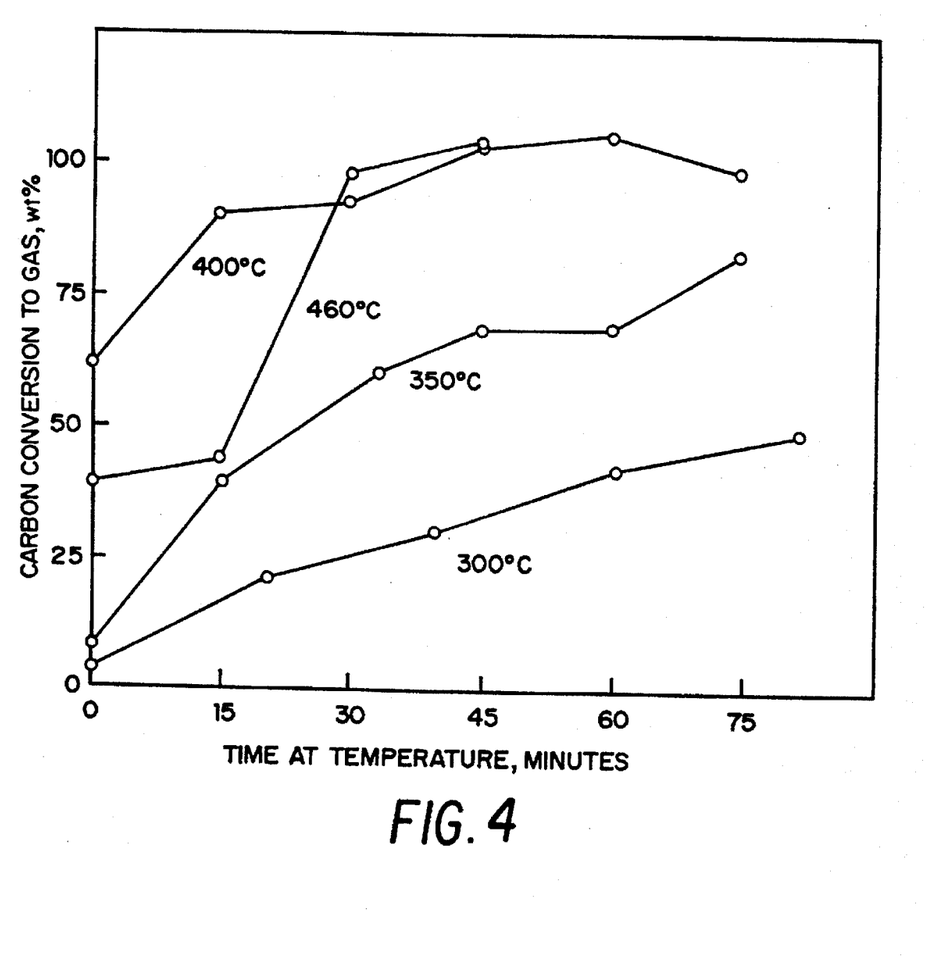
FIG. 4 is a graph showing the effect of temperature on carbon conversion to gas in the present invention.

The effect of temperature on hexone conversion using Ni 1404 was evaluated over the temperature range of 300°–460° C. as shown in FIG. 4. Conversion was high at the three highest temperatures tested: 99.5% at 350° C., 99.7% at 400° C. and 99.9% at 460° C. Conversion fell to 96.6% at 300° C. At 400° C. and 460° C., gas was the only product from hexone conversion. At 350° C., conversion to gas was only 84% and the remainder of the carbon from the hexone was present as a solid on the catalyst. It is believed that if the reactions at 300° C. and 350° C. had been allowed more time, all of the carbon could have been converted to gas.

It is also believed that if carbon collects on the catalyst for a period of time, it may have deleterious effects on the catalyst. Long-term tests in a continuous operation unit are necessary to determined if carbon buildup on the catalysts will be a factor. The concentration of waste (10% in water) was higher than would typically be found. If more dilute solutions are processed, carbon buildup, if it occurs at all, would be slower and is not believed to present a serious problem. In any event, at temperatures above 400° C. carbon buildup does not appear to be a problem.

EFFECT OF ORGANIC CONCENTRATION

Figure 5:
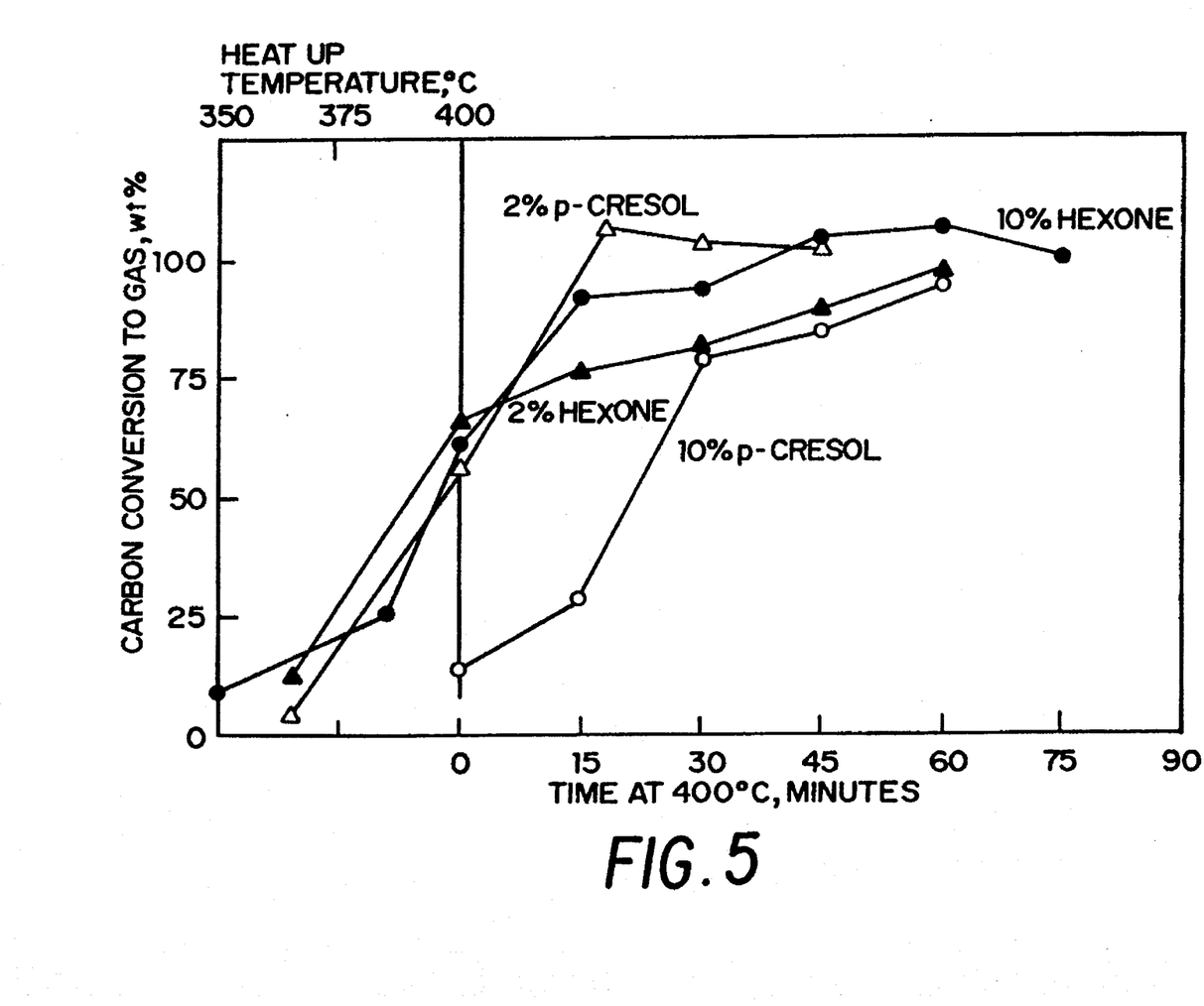
FIG. 5 is a graph showing the effect of organic concentration on carbon conversion to gas in the present invention.

Most of the tests of the present invention were made at 10 wt % organic in water. This level is probably higher than would be typically encountered in an aqueous waste stream but allowed for better mass balances. Tests were made with hexone and p-cresol for comparison. The results of those tests are shown in FIG. 5, which shows carbon conversion to gas as a function of time. Catalyst concentration was kept at 1.2 g catalyst per g of organic. Conversions were 99.9% with both compounds at the 2 wt % level.

In commercial operation, the greatest energy recovery is achieved using highly concentrated organic waste materials and/or materials containing a large quantity of high molecular weight organic compounds.

CONVERSION OF OTHER HYDROCARBONS

Figure 6:
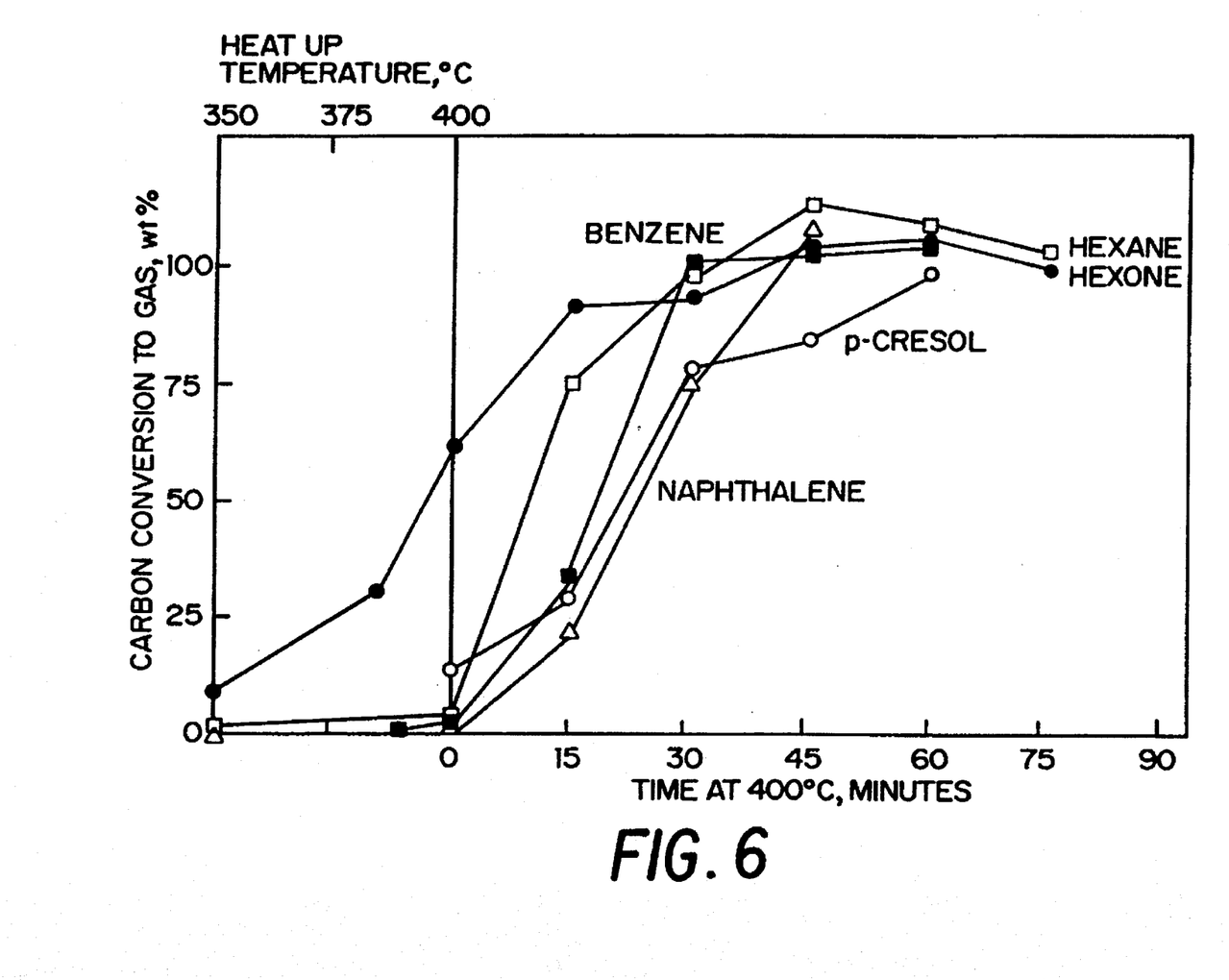
FIG. 6 is a graph showing carbon conversion to gas for various hydrocarbons in accordance with the present invention.

In addition to hexone, tests were made with four other hydrocarbons: hexane, benzene, p-cresol and naphthalene. All of the tests were performed at 400° C. with 10 wt % organic in water mixtures. Ni 1404 at 1.2 g/g organic was utilized. Conversion of all of the compounds was over 99% and in most cases approached 99.9%, as shown in FIG. 6. Hexone and hexane converted most rapidly, with benzene, p-cresol and naphthalene being slightly slower. Gas was the only product from catalytic destruction of these organics except from p-cresol and benzene, where small amounts of other aromatics (0.4–0.8% yield) were present in the liquid effluent.

Other organic waste materials would likewise be converted, including food processing wastes which contain nonlignocellulosic carbohydrates such as sugars and starches. Examples of other waste materials are brewery wastes, potato processing wastes and whey. Conversions of over ninety percent, with high methane yields, have been consistently obtained in one hour runs with whey and glucose feedstocks at temperatures of as low as 350° C. and pressures of at least 209 atm.

For example, glucose was converted at 350° C. and 231 atm using Ni 1404 catalyst. 97.7% of the carbon was converted to gas and 1.4% was converted to liquid. The composition of the gas, in mole%, was as follows: H$_2$ 5.6%, CO$_2$ 50.5%, CH$_4$ 40.1%, C$_2$H$_6$ 1.7%, CO 0% and others 1.2%. The methane yield was 0.3031 CH$_4$ per g glucose.

CONVERSION OF CHLORINATED HYDROCARBONS

Two chlorinated compounds, trichloroethylene (TCE) and chlorobenzene were tested. TCE is representative of a wide number of chlorinated solvents that are often a problem in groundwater. Chlorobenzene was used as a model compound for chlorinated aromatics such as PCBs.

Destruction of both compounds was high, typically 99% for chlorobenzene and 99.9% for TCE at 400° C. and about 300 atm. However, the products were much different than those obtained from other tested hydrocarbons. With chlorobenzene, almost no gas was produced and what little gas that was produced consisted primarily of carbon dioxide compared to the large amounts of methane produced from nonchlorinated hydrocarbons. Benzene was the major product identified.

The conversion of TCE to gas was higher but because TCE is predominately chlorine on a weight basis there is still not much gas produced. In two tests with TCE, 38% of the carbon was converted to gas at 350° C. and 62% at 400° C. The gas was primarily carbon dioxide with a small amounts of both methane and ethane.

However, hydrochloric acid (HCl) was a product from both of the conversion processes, and the HCl appeared to have a detrimental effect on catalyst activity.

PREFERRED METHOD OF LARGER SCALE CONVERSION

Figure 7:
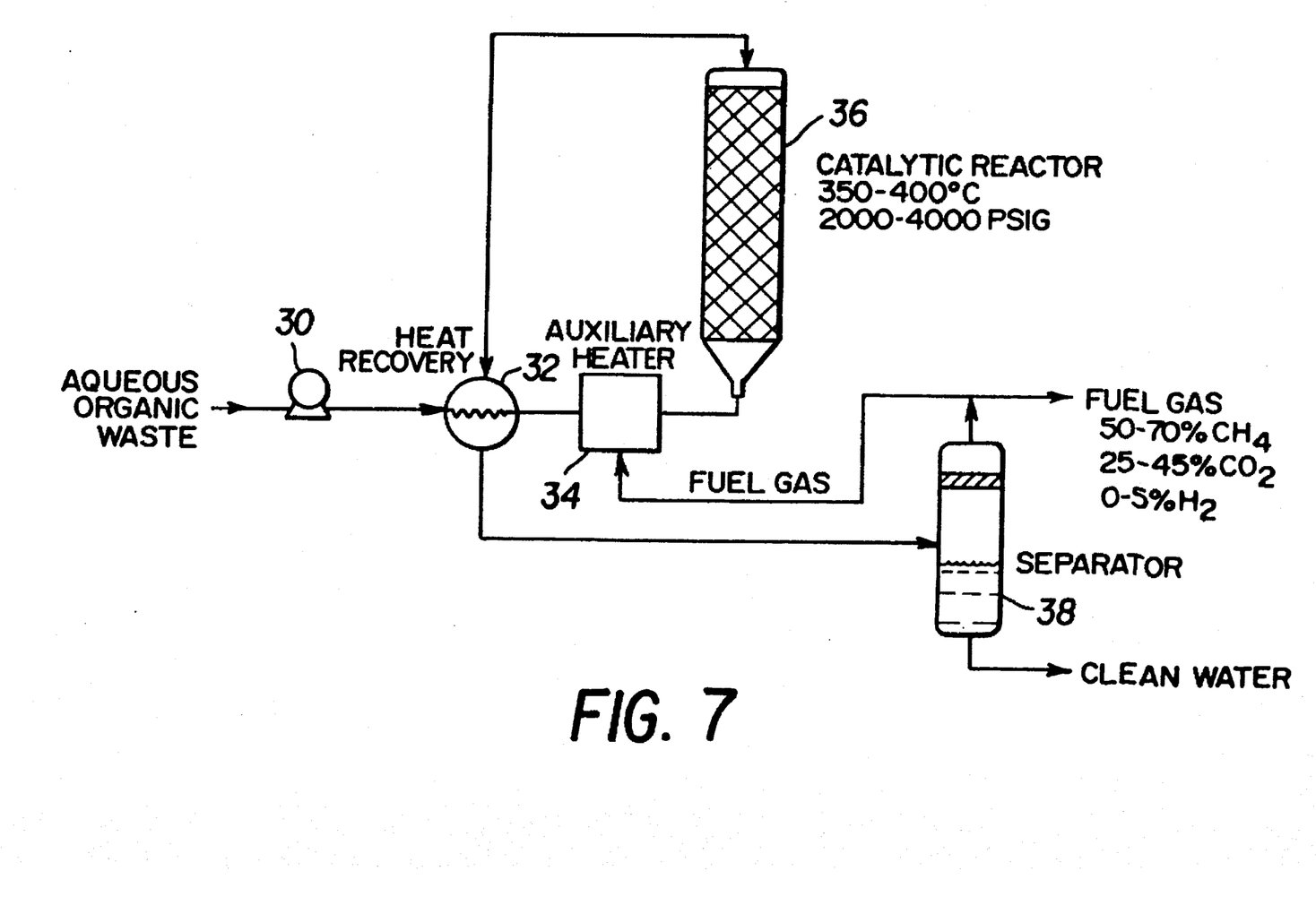
FIG. 7 is a schematic view of a process for the catalytic destruction of organic materials in accordance with the present invention.

FIG. 7 shows an apparatus for a preferred embodiment of the process of the present invention. The organic wastes in an aqueous solution is pumped to 100–300 atm by high pressure pump 30 and then passed through a heat exchanger 32 to preheat the waste stream to 300° C.–400° C. It is believed that most of the preheat can be provided by heat exchange with the reactor effluent. Necessary auxiliary heat may be supplied by an outside heat source or by burning the product gas in heater 34. If the organic content of the waste stream is 1 wt % or more, it should provide sufficient fuel gas to heat the process.

After being preheated, the waste stream is delivered to a pressure reactor 36 for conversion of the organic wastes into a product gas. After being passed through heat exchanger 32 to preheat the incoming waste stream, the effluent from the reactor 36 is separated into its constituent parts, as in separator 38 or other conventional gas recovery methods.

In a continuous system where the product gas may be removed or vented as it is produced, the pressure in the system can be reduced. To minimize the process energy requirements, the pressure must be high enough to minimize the amount of water converted into steam. Based upon the enthalpy and specific volume of water at various conditions, it is believed that the optimum operating conditions are 300° C. to 400° C. and a pressure of at least 100–300 atmospheres.

In all of the lab tests performed, the reactor was held at temperature for about one hour. Over 90% conversion was often achieved in 15–20 minutes based upon monitoring of the gas production. Catalyst loading and contacting also affected the rate of reaction. Based upon the batch lab tests it is believed that a residence time of 30 minutes or less will be sufficient in most cases.

Reduced nickel was the only effective catalyst, as discussed above. Three other transition metals (Co, Fe, Pt) with catalytic properties similar to nickel were all ineffective in the reduced state and as oxides.

Although Ni 1404 and other Ni catalysts may be purchased in a reduced and stabilized form, the reactor could initially be charged with an unreduced nickel catalyst, provided that the catalyst is reduced within the pressure reactor 36. To reduce nickel oxide catalysts to nickel metal they can be treated with flowing hydrogen at temperatures from ambient to 450° C. The catalyst should be reduced until no additional water is formed. Reduction rate is increased by increasing the temperature, but care must be taken not to overheat and sinter the catalyst. Because the reduction is exothermic, it should begin at relative low temperature (usually about 100° C). The temperature should be increased gradually until the reduction is complete.

Although preferred embodiments of the present invention have been shown, it is obvious that many modifications and variations of the invention are possible in light of the above teachings. For example, a variety of batch or continuous reactors could be used, including fixed bed reactors, fluidized bed reactors and the like. For convenience, it is preferred to use a supported catalyst retained within a continuous reactor. It is therefore to be understood that the present invention may be practiced otherwise than as specifically described.

What is claimed is:

1. A method for converting nonlignocellulosic organic waste materials into an innocuous product gas, the method comprising:

providing, in a pressure reactor, a reactant mixture consisting essentially of a liquid nonlignocellulosic organic waste material and liquid water;

maintaining the reactant mixture inside the reactor (a) at conditions, including a temperature of from 250° C. to 500° C. and a pressure that is at least 50 atmospheres and that is sufficient to keep at least a portion of the reactant mixture in the liquid state, and (b) for a time sufficient to produce an innocuous gas product containing methane and carbon dioxide;

catalyzing production of the gas product by providing a catalyst in the reactor, the catalyst consisting essentially of supported or unsupported reduced nickel in an amount sufficient to catalyze production of the gas product; and converting at least 50% of the carbon in the liquid nonlignocellulosic organic waste material to a product gas containing methane and carbon dioxide.

\* \* \* \* \*

UNITED STATES PATENT AND TRADEMARK OFFICE
CERTIFICATE OF CORRECTION

PATENT NO.  : 5,630,854
DATED       : 05/20/97
INVENTOR(S) : LJ Sealock, Jr., EG Baker, DC Elliott It is certified that error appears in the above-identified patent and that said Letters Patent is hereby corrected as shown below:

In column 3, line 10, after the word "dioxide.", please insert the sentence --The amount of pressure should be high enough to inhibit the boiling of water in the reactor so that at least a portion of the reactant mixture is maintained in the liquid state.--.

Signed and Sealed this

Nineteenth Day of May, 1998

Attest:

BRUCE LEHMAN

Attesting Officer

Commissioner of Patents and Trademarks